United States Patent
Niimura

(10) Patent No.: US 9,400,693 B2
(45) Date of Patent: Jul. 26, 2016

(54) CONTROLLING APPLICATION PROGRAMS BASED ON MEMORY USAGE OF A PROCESS AND RIGHT OF APPLICATION PROGRAMS TO USE DISPLAY UNIT

(75) Inventor: Kenji Niimura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 542 days.

(21) Appl. No.: 13/400,813

(22) Filed: Feb. 21, 2012

(65) Prior Publication Data

US 2012/0233624 A1 Sep. 13, 2012

(30) Foreign Application Priority Data

Mar. 7, 2011 (JP) ................................ 2011-048814

(51) Int. Cl.
G06F 9/46 (2006.01)
G06F 9/50 (2006.01)
G06F 9/48 (2006.01)

(52) U.S. Cl.
CPC .............. *G06F 9/5022* (2013.01); *G06F 9/485* (2013.01); *G06F 2209/503* (2013.01); *G06F 2209/504* (2013.01); *G06F 2209/5022* (2013.01); *Y02B 60/142* (2013.01)

(58) Field of Classification Search
CPC . G06F 9/485; G06F 9/5022; G06F 2009/503; G06F 2009/504; G06F 2009/5021; G06F 2009/5022
USPC ................... 718/102, 103, 104; 711/154, 171
See application file for complete search history.

(56) References Cited

U.S. PATENT DOCUMENTS

| | | | | |
|---|---|---|---|---|
| 7,028,298 | B1 * | 4/2006 | Foote ............................. | 718/104 |
| 8,103,769 | B1 * | 1/2012 | Weiser et al. .................. | 709/225 |
| 8,321,558 | B1 * | 11/2012 | Sirota et al. ................... | 709/224 |
| 8,327,371 | B2 * | 12/2012 | Horii et al. ..................... | 718/104 |
| 8,635,405 | B2 * | 1/2014 | Nishihara et al. ............. | 711/119 |
| 8,959,515 | B2 * | 2/2015 | Qin ................................ | 718/100 |
| 2005/0021917 | A1 * | 1/2005 | Mathur et al. ................. | 711/159 |
| 2007/0124510 | A1 | 5/2007 | Ando | |
| 2008/0189793 | A1 * | 8/2008 | Kirkup ..................... | G06F 21/53 726/27 |
| 2009/0113444 | A1 * | 4/2009 | Hackborn ............... | G06F 9/461 719/312 |
| 2009/0119553 | A1 * | 5/2009 | Matsushima .................. | 714/57 |
| 2009/0133029 | A1 * | 5/2009 | Varadarajan ............ | G06F 9/485 718/104 |
| 2009/0248996 | A1 * | 10/2009 | Mandyam et al. ............ | 711/154 |
| 2010/0043004 | A1 * | 2/2010 | Tambi et al. .................. | 718/103 |
| 2010/0122257 | A1 * | 5/2010 | Wada ....................... | G06F 9/485 718/102 |
| 2011/0296421 | A1 * | 12/2011 | Gschwind ............. | G06F 9/3851 718/102 |
| 2012/0054466 | A1 * | 3/2012 | Devendran .............. | G06F 12/10 711/207 |

FOREIGN PATENT DOCUMENTS

JP 2003-015892 1/2003
JP 2005-202652 7/2005

(Continued)

OTHER PUBLICATIONS

Japanese Office Action dated Novemeber 25, 2014—Machine Translation.*

*Primary Examiner* — Abu Ghaffari
(74) *Attorney, Agent, or Firm* — IPUSA, PLLC

(57) ABSTRACT

An apparatus includes a monitoring unit configured to monitor memory usage of a process in which multiple application programs are running, and a control unit configured to terminate one or more of the application programs when the memory usage of the process exceeds a first threshold.

12 Claims, 5 Drawing Sheets

(56) References Cited

FOREIGN PATENT DOCUMENTS

| JP | 2005-269439 | 9/2005 |
| JP | 2007-058412 | 3/2007 |
| JP | 2007-110689 | 4/2007 |

* cited by examiner

FIG.4

```
1    <?xml version="1.0" encoding="UTF-8"?>
2    <!-- DALP File for Device-SDK Sample Application -->
3
4    <dalp dsdk="" version="0.10">
5
6      <information>
7        <product-id>321321</product-id>
8        <title>demoxlet</title>
9        <vendor>ABC Company</vendor>
10     </information>
11
12     <resources>
13       <dsdk version ="1.0"/>
14       <jar href="./demo.jar"base path="current" />
15     </resources>
16
17     <application-desc
18       main-class="DemoApplication"
19       priority="high"
20       auto-appli-manage="true"
21       min-memory="0.3MB"
22       max-memory="1.5MB">
23     </application-desc>
24
25   </dalp>
```

FIG.5

```
1  <?xml version="1.0" encoding="UTF-8"?>
2
3  <appli-manager>
4    <algorithm
5      type="memory-priority"
6      lower-threshold-memory="20MB"
7      upper-threshold-memory="28MB"
8    </algorithm>
9  </appli-manager>
```

FIG.6

```
1 <?xml version="1.0" encoding="UTF-8"?>
2
3 <appli-manager>
4   <algorithm
5     type="memory-panel-owner"
6     lower-threshold-memory="20MB"
7     upper-threshold-memory="28MB"
8   </algorithm>
9 </appli-manager>
```

FIG.7

```
1 <?xml version="1.0" encoding="UTF-8"?>
2
3 <appli-manager>
4   <algorithm
5     type="memory-frequency"
6     lower-threshold-memory="20MB"
7     upper-threshold-memory="28MB"
8   </algorithm>
9 </appli-manager>
```

CONTROLLING APPLICATION PROGRAMS BASED ON MEMORY USAGE OF A PROCESS AND RIGHT OF APPLICATION PROGRAMS TO USE DISPLAY UNIT

CROSS-REFERENCE TO RELATED APPLICATION

The present application is based upon and claims the benefit of priority of Japanese Patent Application No. 2011-048814, filed on Mar. 7, 2011, the entire contents of which are incorporated herein by reference.

BACKGROUND OF THE INVENTION

1. Field of the Invention

An aspect of this disclosure relates to an apparatus, a control method, and a storage medium.

2. Description of the Related Art

In a device such as a multifunction peripheral, multiple application programs (hereafter simply referred to as "applications") are executed using limited memory resources. In such a device, generally, one application is executed as one process, so that this mechanism is referred to as "one application per process" herein. However, there is also a device where multiple applications are executed as one process (or on one process), and this mechanism is referred to as "multiple applications per process" herein (see, for example, Japanese Laid-Open Patent Publication No. 2005-269439).

When the "multiple applications per process" mechanism is employed, a memory space is shared by multiple applications running in a process. In this case, if the memory usage of an application increases more than expected and the process runs out of memory, it affects not only that application but also the other applications. As a result, for example, the other applications may malfunction or may become inoperative.

SUMMARY OF THE INVENTION

In an aspect of this disclosure, there is provided an apparatus that includes a monitoring unit configured to monitor memory usage of a process in which multiple application programs are running, and a control unit configured to terminate one or more of the application programs when the memory usage of the process exceeds a first threshold.

BRIEF DESCRIPTION OF THE DRAWINGS

FIG. 4 is a drawing illustrating an exemplary application information file;

FIG. 5 is a drawing illustrating a first example of a control information file;

FIG. 6 is a drawing illustrating a second example of a control information file; and FIG. 7 is a drawing illustrating a third example of a control information file.

DESCRIPTION OF THE PREFERRED EMBODIMENTS

Figure 1:
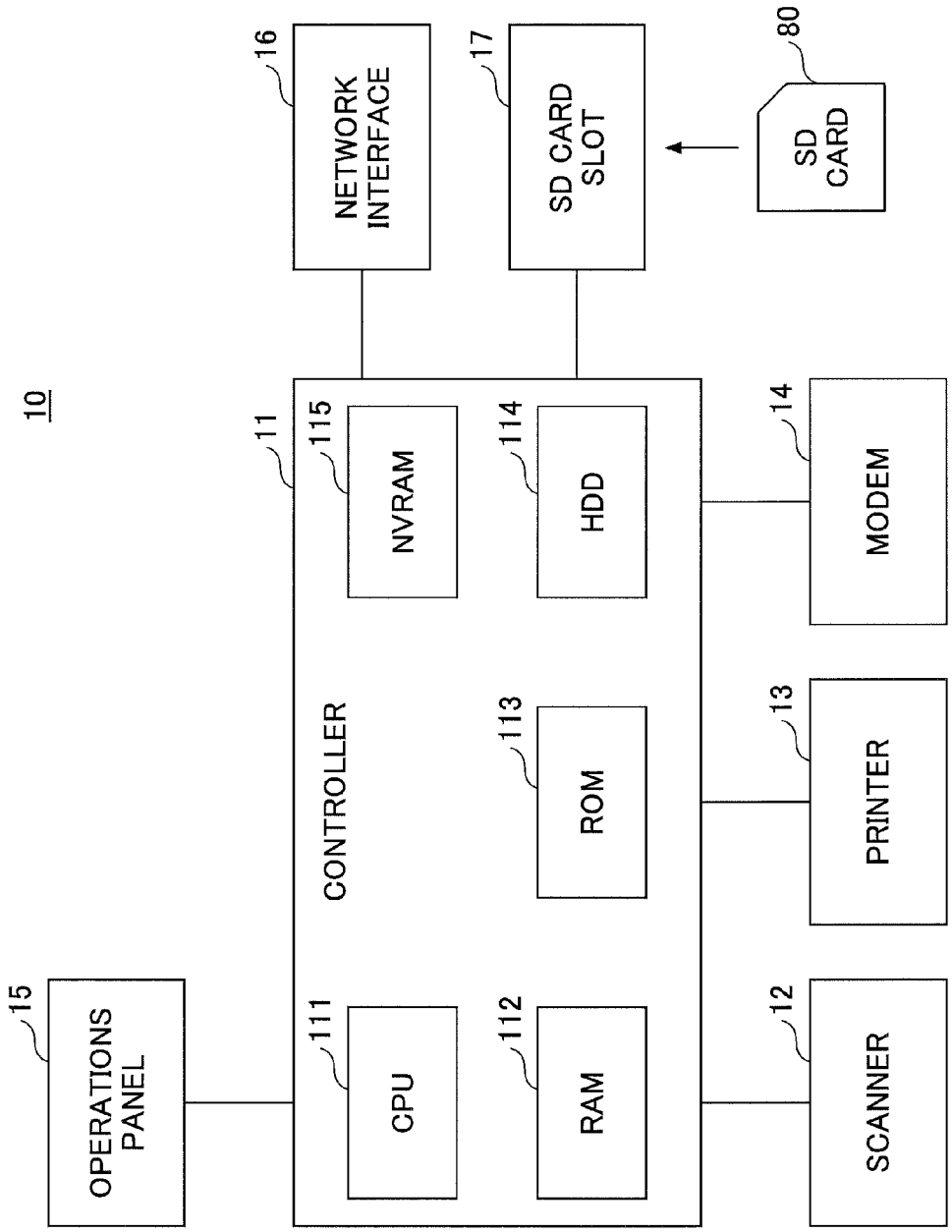
FIG. 1 is a block diagram illustrating an exemplary hardware configuration of an image forming apparatus.

Preferred embodiments of the present invention are described below with reference to the accompanying drawings. In the descriptions below, an image forming apparatus 10 is used as an example of an apparatus (or an information processing apparatus) according to an aspect of this disclosure. FIG. 1 is a block diagram illustrating an exemplary hardware configuration of the image forming apparatus 10. As illustrated in FIG. 1, the image forming apparatus 10 may include, as hardware components, a controller 11, a scanner 12, a printer 13, a modem 14, an operations panel 15, a network interface 16, and a secure digital (SD) card slot 17.

The controller 11 may include a central processing unit (CPU) 111, a random access memory (RAM) 112, a read-only memory (ROM) 113, a hard disk drive (HDD) 114, and a non-volatile RAM (NVRAM) 115. The ROM 113 stores, for example, programs and data used by the programs. The RAM 112 is used, for example, as a storage area into which programs are loaded and as a work area for the loaded programs. The CPU 111 executes the programs loaded into the RAM 112 to implement various functions. The HDD 114 stores, for example, programs and data used by the programs. The NVRAM 115 stores, for example, various settings.

The scanner 12 is a hardware component (image scanning unit) for scanning a document to obtain image data. The printer 13 is a hardware component (printing unit) for printing print data on a recording medium such as paper. The modem 14 is a hardware component for connecting the image forming apparatus 10 to a telephone line and is used to send and receive image data for facsimile communications. The operations panel 15 is a hardware component including an input unit such as buttons for receiving user inputs and a display unit such as a liquid crystal display panel. The network interface is a hardware component for connecting the image forming apparatus 10 to a (wired or wireless) network such as a local area network (LAN). The SD card slot 17 reads, for example, programs stored in a secure digital (SD) card 80. With the image forming apparatus 10 configured as described above, in addition to the programs stored in the ROM 113 and the HDD 114, programs stored in the SD card 80 can be loaded into the RAM 112 and executed. Instead of the SD card 80, any other storage medium (e.g., a CD-ROM or a universal serial bus (USB) memory) may also be used for this purpose. That is, a storage medium that can be mounted on the image forming apparatus 10 is not limited to the SD card 80. When a storage medium other than the SD card 80 is used, the SD card slot 17 may be replaced with a hardware component corresponding to the storage medium used.

Figure 2:
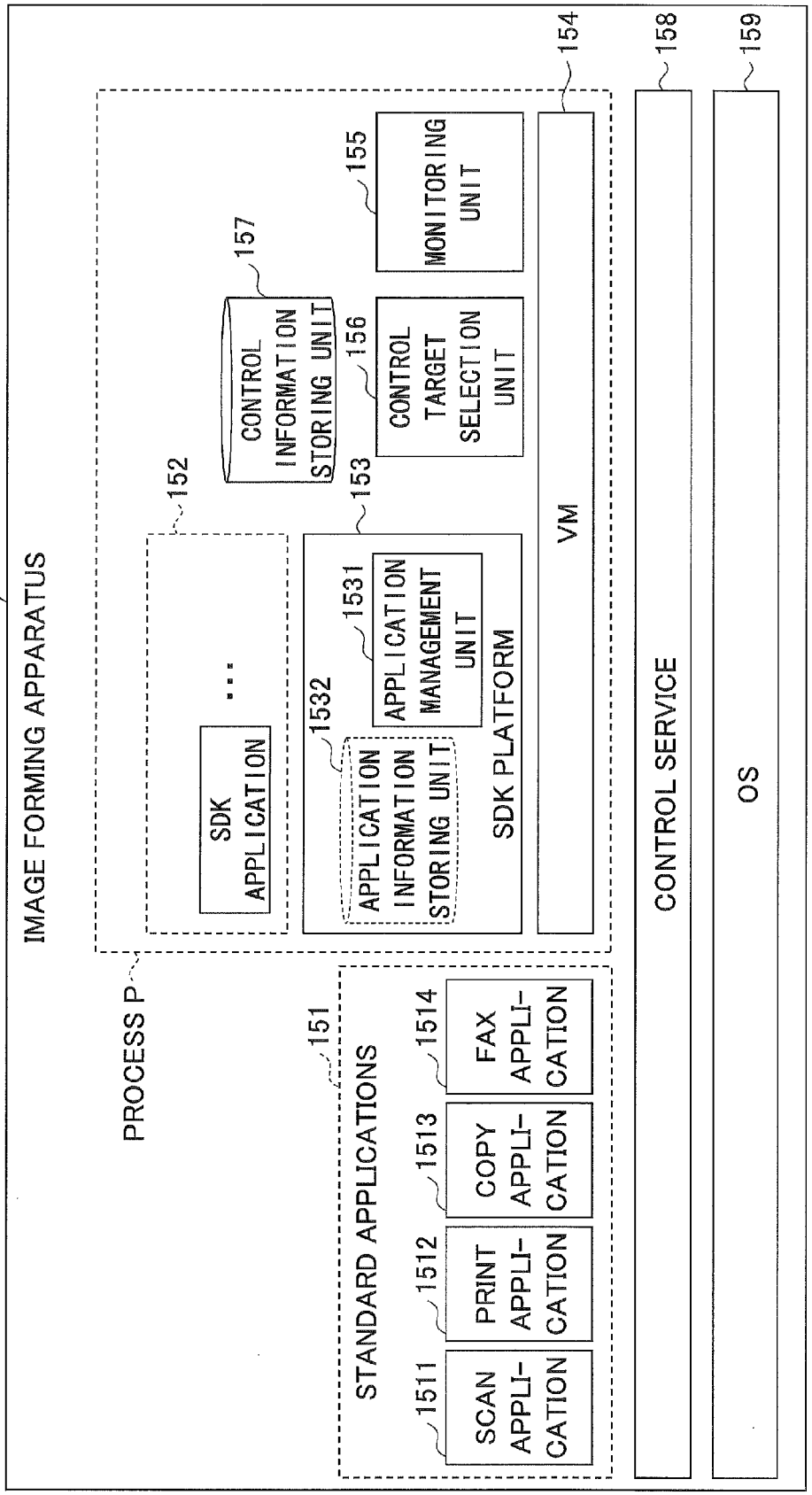
FIG. 2 is a drawing illustrating an exemplary software configuration of an image forming apparatus.

FIG. 2 is a drawing illustrating an exemplary software configuration of the image forming apparatus 10. As illustrated in FIG. 2, the image forming apparatus 10 may include standard applications 151, SDK applications 152, an SDK platform 153, a virtual machine (VM) 154, a monitoring unit 155, a control target selection unit 156, a control information storing unit 157, a control service 158, and an operating system (OS) 159.

The standard applications 151 are default applications installed in the image forming apparatus 10 before the factory shipment. In the example of FIG. 2, the standard applications 151 include a scan application 1511, a print application 1512, a copy application 1513, and a fax application 1514. The scan application 1511 performs a scan job. The print application 1512 performs a print job. The copy application 1513 performs a copy job. The fax application 1514 performs a facsimile transmission job and a facsimile reception job. Each of the standard applications 151 is executed as one process.

The control service 158 is implemented by software modules that, for example, provide upper-layer applications with functions for controlling various hardware resources, and perform fundamental functions of the image forming apparatus 10.

The SDK applications 152 (may be referred to in their singular form for descriptive purposes) are plug-in applications that are additionally installed to add functions to the image forming apparatus 10 after its factory shipment. Applications implementing any appropriate functions may be provided as the SDK applications 152. The SDK applications 152 may be installed, for example, via the SD card 80 or a network into the image forming apparatus 10.

The SDK platform 153 provides an execution environment and common functions for the SDK applications 152. The SDK applications 152 are developed using application programming interfaces (API) provided by the SDK platform 153 (those APIs are hereafter referred to as SDKAPIs). For example, the SDK platform 153 provides the SDK applications 152 with an SDKAPI for a scan function, an SDKAPI for a print function, and an SDKAPI for a copy function. When an SDKAPI is called, the SDK platform 153 inputs a request corresponding to the called SDKAPI to the control service 158, and thereby causes the image forming apparatus 10 to perform a process corresponding to the called SDKAPI.

SDKAPIs may be made public to allow a third party to develop the SDK applications 152. Since the SDKAPIs are machine-independent, it is generally not necessary to modify the SDK applications 152 for different types (or models) of image forming apparatuses. Here, the SDK platform 153 itself is also a type of an application program installed in the image forming apparatus 10. The SDK platform 153 may be installed, for example, via the SD card 80 or a network into the image forming apparatus 10.

Programs that can be installed into the image forming apparatus 10 are not limited to the SDK applications 152 and the SDK platform 153 that are provided as examples in the present embodiment. Any appropriate programs may be additionally installed into the image forming apparatus 10.

The SDK platform 153 includes an application management unit 1531 and an application information storing unit 1532. The application management unit 1531 installs and uninstalls the SDK applications 152, and also controls start and termination of the SDK applications 152. The application information storing unit 1532 stores a file (hereafter referred to as an "application information file") for each SDK application 152 which includes attribute information of the SDK application 152. Here, an installation package (e.g., an archive file) of each SDK application 152 may include an executable file and application information file of the SDK application 152. When installing an SDK application 152, the application management unit 1531 stores the application information file included in the installation package of the SDK application 152 in the application information storing unit 1532. The application information storing unit 1532 may be implemented, for example, by a storage area of the HDD 114 or the NVRAM 115.

The VM 154 is, for example, a Java (registered trademark) virtual machine. In FIG. 2, the SDK applications 152, the SDK platform 153, the monitoring unit 155, and the control target selection unit 156 are programs that run on the VM 154. Therefore, when the VM 154 is a Java virtual machine, the SDK applications 152, the SDK platform 153, the monitoring unit 155, and the control target selection unit 156 are implemented as Java (registered trademark) programs.

The programs (surrounded by a dotted line P) on the VM 154 run in one process (or on one process). This process is hereafter referred to as a "process P". For example, the SDK applications 152 are executed as threads in the process P. Accordingly, the SDK applications 152 share memory resources assigned to the process P by the OS 159. Thus, the process P is an example of the "multiple applications per process".

The monitoring unit 155 continuously monitors memory usage (or memory consumption) of the process P. The monitoring unit 155 compares the monitored memory usage of the process P with a predetermined condition (or conditions) and if the condition (or one of the conditions) is satisfied, reports to the control target selection unit 156 that the condition is satisfied.

When receiving the report from the monitoring unit 155, the control target selection unit 156 selects, based on contents (control information) in a control information file stored in the control information storing unit 157, one or more of the SDK applications 152 as targets (control targets) whose start or termination is to be controlled. The control target selection unit 156 requests the application management unit 1531 to start or terminate the selected SDK application(s) 152. The control target selection unit 156 or a combination of the control target selection unit 156 and the application management unit 1531 may be called a control unit.

The control information storing unit 157 stores a control information file that includes conditions to be compared with memory usage of the process P by the monitoring unit 155 and information indicating a criterion used by the control target selection unit 156 to select one or more SDK applications 152 as control targets. The control information storing unit 157 may be implemented, for example, by a storage area of the HDD 114 or the NVRAM 115.

The OS 159 is an operating system.

An exemplary process performed by the image forming apparatus 10 is described below.

Figure 3:
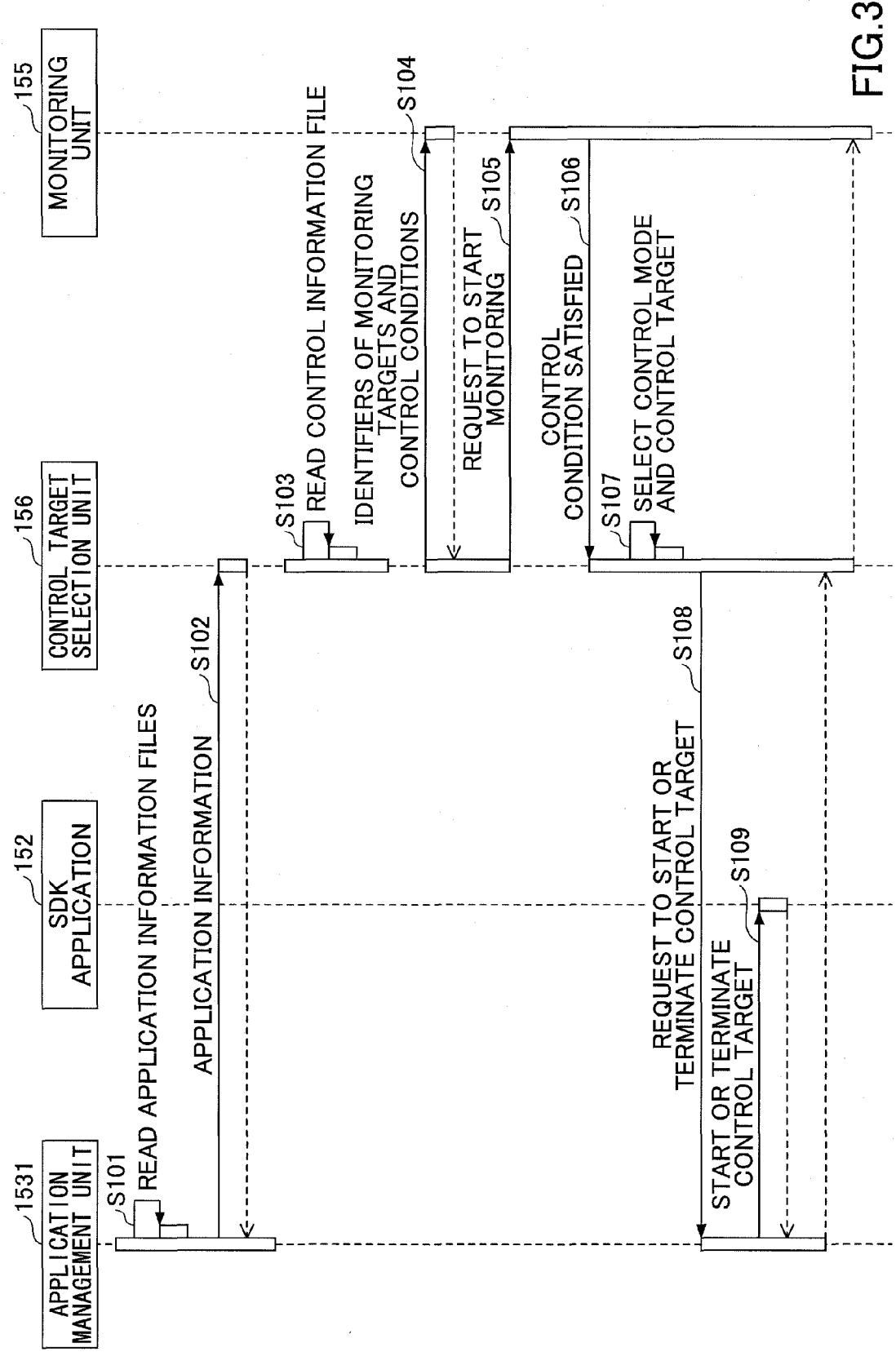
FIG. 3 is a sequence chart illustrating an exemplary process of controlling SDK applications according to memory usage.

FIG. 3 is a sequence chart illustrating an exemplary process of controlling the SDK applications 152 according to memory usage. The process of FIG. 3 is started, for example, when the image forming apparatus 10 is started.

In step S101, the application management unit 1531 reads the application information files of the SDK applications 152 installed in the image forming apparatus 10 from the application information storing unit 1532, and loads information in the read application information files to, for example, the RAM 112.

FIG. 4 is a drawing illustrating an exemplary application information file. In this example, information in the application information file is written in eXtensible Markup Language (XML). However, the application information file may also be written in any other format. For example, the application information file may be written in a comma separated value (CSV) format. Line numbers in FIG. 4 are added for descriptive purposes.

In FIG. 4, lines 6 through 10 represent information for identifying an SDK application 152 for which the application information file is provided (hereafter, the identified SDK application 152 is referred to as a subject application). For example, line indicates an identifier (product ID) of the subject application.

Lines 12 through 15 indicate a file implementing the subject application. In this example, the subject application (the SDK application 152) is implemented by a file with a file name "demo.jar".

Lines 17 through 23 include information related to operational conditions of the subject application. For example, line 18 indicates a class name "DemoApplication" of the main class of the subject application. The main class, here, indicates a class to be operated by the application management unit 1531. The main class of each SDK application 152 includes an interface (e.g., a method) with the application management unit 1531. The application management unit 1531 controls the SDK application 152 via the interface (or the method).

Line 19 indicates a priority level of the subject application. In the present embodiment, the priority level is indicated by one of "high", "middle", and "low". The priority level is used when selecting an SDK application(s) 152 to be controlled. Line 20 indicates whether the subject application is a candidate for a control target to be controlled according to the memory usage of the process P (or whether the subject application is a monitoring target to be monitored). When auto-appli-manage="true", the subject application is a candidate for a control target. Meanwhile, when auto-appli-manage="false", the subject application is not a candidate for a control target. Being a candidate for a control target indicates that the subject application may be forcibly or automatically terminated or started according to the memory usage of the process P.

Line 21 indicates the minimum amount of memory required by the subject application (minimum memory usage). Line 22 indicates the maximum amount of memory required by the subject application (maximum memory usage). In the example of FIG. 4, the amount of memory required by the subject application is greater than or equal to 0.3 MB and less than or equal to 1.5 MB.

Next, the application management unit 1531 sends the information (hereafter called "application information") in the read application information files to the control target selection unit 156 (S102). Instead of sending the application information itself, the application management unit 1531 may be configured to send an address (or pointer) indicating the location of a storage area into which the application information is loaded. Then, the control target selection unit 156 reads the control information file from the control information storing unit 157 (S103).

FIG. 5 is a drawing illustrating a first example of the control information file. In this example, the control information file is written in XML. However, the control information file may also be written in any other format. For example, the control information file may be written in a comma separated value (CSV) format. Line numbers in FIG. 5 are added for descriptive purposes.

In FIG. 5, line 5 represents a selection criterion for selecting a control target. In this example, "memory-priority" in line 5 indicates that a control target(s) (i.e., an SDK application(s) 152 to be controlled) is selected based on the priority level. In other words, "memory-priority" indicates that SDK applications 152 with higher priority levels are preferentially kept running (or active). Lines 6 and 7 represent control conditions (or timing) for starting or terminating the selected control target. More specifically, line 7 indicates that an SDK application 152 selected according to the selection criterion of line is forcibly terminated when the memory usage of the process P exceeds an upper threshold of 28 MB. Meanwhile, line 6 indicates that an inactive SDK application 152 is started to run in the process P when the memory usage of the process P falls below a lower threshold of 20 MB.

Accordingly, with the control information file of FIG. 5, events where the memory usage of the process P exceeds 28 MB and falls below 20 MB are defined as control conditions. The upper and lower thresholds are preferably determined such that a safety margin is provided on each end of the allowable range of the memory usage of the process P. For example, the upper threshold may be determined by subtracting a predetermined value from the upper limit of the allowable range of the memory usage of the process P, and the lower threshold may be determined by adding a predetermined value to the lower limit of the allowable range of the memory usage of the process P.

The information at line 5 is used by the control target selection unit 156 and the information at lines 6 and 7 is used by the monitoring unit 155.

Referring back to FIG. 3, the control target selection unit 156 sends, to the monitoring unit 155, identifiers of SDK applications 152 (monitoring targets) to be monitored and the control conditions obtained from the control information (FIG. 5) in the read control information file (S104). SDK applications 152 corresponding to the application information files where "auto-appli-manage" is "true" (line 20 in FIG. 4) are selected as monitoring targets. The identifiers of the SDK applications 152 are obtained from line 7 of the respective application information files.

Next, the control target selection unit 156 requests the monitoring unit 155 to start monitoring the memory usage of the process P (S105). In response to the request, the monitoring unit 155 starts monitoring the process P. When the monitoring unit 155 runs as a part of the process P as in the present embodiment, the monitoring unit 155 can easily identify the process P to be monitored. Even when the monitoring unit 155 is not a part of the process P, the monitoring unit 155 can identify the process P based on identification information of the process P. Instead of monitoring the memory usage of the process P, the memory usage of the respective SDK applications 152 selected as monitoring targets may be monitored, and the total memory usage of the monitoring targets may be compared with the control conditions. When the SDK applications 152 are Java (registered trademark) programs, the memory usage of the SDK applications 152 may be monitored using known technologies such as Java Management Extensions (JMX) and Java Virtual Machine Tool Interface (JVMTI).

When monitored memory usage satisfies one of the control conditions, the monitoring unit 155 reports the satisfied control condition to the control target selection unit 156 (S106). Assuming that the control information file of FIG. 5 is used, information indicating that the memory usage of the process P has exceeded the upper threshold or fallen below the lower threshold is reported to the control target selection unit 156.

Next, the control target selection unit 156 selects (or determines) a control mode (start or termination) and an SDK application 152 to be controlled, based on the application information (FIG. 4) of the respective SDK applications 152, the control information (FIG. 5), and the reported (or satisfied) control condition (S107).

For example, when it is reported that the memory usage of the process P has exceeded the upper threshold, the control target selection unit 156 determines to terminate one (or more) of the active (i.e., running) SDK applications 152. More specifically, according to the selection criterion in the control information, the control target selection unit 156 selects, from the active SDK applications 152 identified as monitoring targets, an SDK application(s) 152 with a lower (or lowest) priority level as a control target to be terminated. The priority levels of the SDK applications 152 may be determined based on their application information. The control target selection unit 156 can determine whether the SDK applications 152 are active (running) or inactive (terminated) by querying the application management unit 1531. The application management unit 1531 maintains information indicating whether the SDK applications 152 are active or inactive to control start and termination of the SDK applications 152. When multiple SDK applications 152 are selected based on the priority levels, an SDK application(s) 152 whose maximum memory usage or minimum memory usage is the highest among the selected SDK applications 152 may be selected as the control target to be terminated. This makes it possible to effectively reduce the memory usage of the process P while reducing the number of SDK applications 152 to be terminated. Still, however, all the SDK applications 152 selected based on the priority levels may be terminated.

Meanwhile, when it is reported that the memory usage of the process P has fallen below the lower threshold, the control target selection unit 156 determines to start one (or more) of the inactive SDK applications 152. More specifically, the control target selection unit 156 selects an SDK application(s) 152 with a higher (or highest) priority level as a control target to be started, from the inactive SDK applications 152 identified as monitoring targets and having minimum memory usage that is less than or equal to the difference between the upper threshold and the current memory usage of the process P (so that the memory usage of the process P does not exceed the upper threshold even when the minimum memory usage of the control target is added). When multiple SDK applications 152 are selected based on the priority levels, an SDK application 152 whose maximum memory usage or minimum memory usage is the lowest among the selected SDK applications 152 may be selected as the control target to be started. This makes it possible to reduce the risk of causing the memory usage of the process P to exceed the upper threshold.

Then, the control target selection unit 156 sends the selected control mode (start or termination) and the identifier(s) of the selected SDK application(s) 152 to request the application management unit 1531 to start or terminate the selected SDK application(s) 152 (S108). Based on the control mode and the identifier, the application management unit 1531 starts or terminates the selected SDK application 152 (S109). When the selected SDK application 152 is terminated, the memory area being occupied by the selected SDK application 152 is released. As a result, the memory usage of the process P is reduced. Meanwhile, when the selected SDK application 152 is started, the number of active SDK applications 152 increases.

According to the above embodiment, when the memory usage of the process P exceeds the upper threshold, one or more of the SDK applications 152 running in the process P are terminated. This method or configuration makes it possible to properly control the memory usage of the process P (i.e., the memory usage of the SDK applications 152 running in the process P).

Also according to the above embodiment, when the memory usage of the process P falls below the lower threshold, one or more inactive SDK applications 152 are started. This method or configuration makes it possible to increase the number of active SDK applications 152, thereby making it possible to increase the number of services available for the user.

In the above embodiment, a control target is selected based on the priority level. However, any other criterion may be used to select a control target.

FIG. 6 is a drawing illustrating a second example of the control information file. In the control information file of FIG. 6, "memory-panel-owner" is specified at line 5 as the selection criterion for selecting a control target. In this example, "memory-panel-owner" indicates that SDK applications 152 having an owner right of the operations panel 15 (or a right to use a display unit) are preferentially kept running (or active). The owner right of the operations panel 152 enables the SDK applications 152 to provide a user interface via the operations panel 152. In other words, SDK applications 152 with the owner right can receive user inputs or provide information to the user via the operations panel 15. Meanwhile, SDK applications 152 without the owner right for the operations panel 15 are, for example, server applications that receive requests via a network and send processing results corresponding to the requests via the network.

When the control information file of FIG. 6 is used, the control target selection unit 156, in step S107 of FIG. 3, preferentially selects an SDK application 152 without the owner right of the operations panel 15 as a control target to be terminated, or selects an SDK application 152 with the owner right of the operations panel 15 as a control target to be started.

This method of preferentially keeping SDK applications 152 with the owner right of the operations panel 15 running makes it possible to improve the availability of the SDK applications 152 to be operated via the operations panel 15. In other words, this method makes it possible to reduce the need for the user to manually start the SDK applications 152 with the owner right via a control screen displayed on the operations panel 15 by the application management unit 1531.

Information indicating whether the SDK application 152 has the owner right of the operations panel 15 may be included, for example, in the application information file.

FIG. 7 is a drawing illustrating a third example of the control information file. In the control information file of FIG. 7, "memory-frequency" is specified at line 5 as the selection criterion for selecting a control target. In this example, "memory-frequency" indicates that frequently-used SDK applications 152 are preferentially kept running (or active).

When the control information file of FIG. 7 is used, the control target selection unit 156, in step S107 of FIG. 3, preferentially selects a less (or least) frequently used SDK application 152 as a control target to be terminated, or selects a more (or most) frequently used SDK application 152 as a control target to be started.

This method of preferentially keeping frequently-used SDK applications 152 running makes it possible to reduce the need for the user to manually start the SDK applications 152 via a control screen displayed on the operations panel 15 by the application management unit 1531.

The usage frequency of the SDK application 152 (or the number of times the SDK application 152 is used or selected) may be recorded, for example, in the HDD 114 or the NVRAM 115 by the application management unit 1531.

A control target may also be selected based on a combination of two or more of the priority level, the owner right of the operations panel 15, and the usage frequency.

In the above embodiments, the SDK applications 152 are controlled (started or terminated) based on the memory usage. Alternatively, the SDK applications 152 may be controlled based on the usage of other hardware resources such as a CPU.

An aspect of this disclosure provides an apparatus, a control method, and a non-transitory computer-readable storage medium storing program code that make it possible to properly control the memory usage of application programs running in the same process.

The present invention is not limited to the specifically disclosed embodiments, and variations and modifications may be made without departing from the scope of the present invention.

What is claimed is:

1. An apparatus, comprising:
a display unit;
a memory that stores a program; and
a processor that executes the program to implement
a monitoring unit configured to monitor memory usage of a process in which multiple application programs are running, the application programs running on the same apparatus and sharing a memory resource of the apparatus assigned to the process, and
a control unit configured to terminate one or more of the application programs when the memory usage of the process exceeds a first threshold; and
a storage unit that stores right information indicating whether the respective application programs have a right to use the display unit,
wherein the control unit is configured to
terminate, one or more of the application programs that do not have the right to use the display unit based on the right information when the memory usage of the process exceeds the first threshold, and
start one or more of the terminated application programs to run in the process when the memory usage of the process fails below a second threshold that is different from the first threshold.

2. The apparatus as claimed in claim 1, wherein
the storage unit also stores priority information indicating priority levels of the application programs; and
the control unit is configured to also preferentially terminate one or more of the application programs with lower priority levels based on the priority information when the memory usage of the process exceeds the first threshold.

3. The apparatus as claimed in claim 1, wherein
the storage unit also stores frequency information indicating a number of times each of the application programs is used; and
the control unit is configured to also preferentially terminate one or more of the application programs that are less frequently used based on the frequency information when the memory usage of the process exceeds the first threshold.

4. The apparatus as claimed in claim 1, wherein
the storage unit also stores control target indicators indicating whether the respective application programs are control targets; and
when the memory usage of the process exceeds the first threshold, the control unit is configured to terminate one or more of the application programs that are determined as the control targets based on the control target indicators.

5. A method performed by an apparatus, the method comprising:
monitoring memory usage of a process in which multiple application programs are running, the application programs running on the same apparatus and sharing a memory resource of the apparatus assigned to the process;
when the memory usage of the process exceeds a first threshold, terminating one or more of the application programs; and
when the memory usage of the process falls below a second threshold that is different from the first threshold, starting one or more of the terminated application programs to run in the process, wherein
the terminating includes referring to a storage unit of the apparatus that stores right information indicating whether the respective application programs have a right to use a display unit of the apparatus, and
in the terminating, one or more of the application programs that do not have the right to use the display unit are terminated based on the right information.

6. The method as claimed in claim 5, wherein
the storage unit also stores priority information indicating priority levels of the application programs; and
in the terminating, one or more of the application programs with lower priority levels are also preferentially terminated based on the priority information.

7. The method as claimed in claim 5, wherein
the storage unit also stores frequency information indicating a number of times each of the application programs is used; and
in the terminating, one or more of the application programs that are less frequently used are also preferentially terminated based on the frequency information.

8. The method as claimed in claim 5, wherein
the storage unit also stores control target indicators indicating whether the respective application programs are control targets; and
in the terminating, when the memory usage of the process exceeds the first threshold, one or more of the application programs determined as the control targets based on the control target indicators are terminated.

9. A non-transitory computer-readable storage medium storing program code for causing, an apparatus to perform a method, the method comprising:
monitoring memory usage of a process in which multiple application programs are running, the application programs running on the same apparatus and sharing a memory resource of the apparatus assigned to the process;
when the memory usage of the process exceeds a first threshold, terminating one or more of the application programs; and
when the memory usage of the process falls below a second threshold that is different from the first threshold, starting one or more of the terminated application programs to run in the process, wherein
the terminating includes referring to a storage unit of the apparatus that stores right information indicating whether the respective application programs have a right to use a display unit of the apparatus, and
in the terminating, one or more of the application. programs that do not have the right to use the display unit are terminated based on the right information.

10. The storage medium as claimed in claim 9, wherein
the storage unit also stores priority information indicating priority levels of the application programs; and
in the terminating, one or more of the application programs with lower priority levels are also preferentially terminated based on the priority information.

11. The storage medium as claimed in claim 9, wherein
the storage unit also stores frequency information indicating a number of times each of the application programs is used; and
in the terminating, one or more of the application programs that are less frequently used are also preferentially terminated based on the frequency information.

12. The storage medium as claimed in claim 9, wherein
the storage unit also stores control target indicators indicating whether the respective application programs are control targets; and
in the terminating, when the memory usage of the process exceeds the first threshold, one or more of the application programs determined as the control targets based on the control target indicators are terminated.

* * * * *